(12) United States Patent
Marton

(10) Patent No.: US 7,628,271 B1
(45) Date of Patent: Dec. 8, 2009

(54) MULTI-FUNCTIONAL CARRYING CASE FOR LAPTOPS AND LIKE PORTABLE COMPUTERS

(76) Inventor: Richard Marton, 82 Arnot Pl., Paramus, NJ (US) 07852

(*) Notice: Subject to any disclaimer, the term of this patent is extended or adjusted under 35 U.S.C. 154(b) by 472 days.

(21) Appl. No.: 11/503,039

(22) Filed: Aug. 11, 2006

Related U.S. Application Data

(60) Provisional application No. 60/707,107, filed on Aug. 11, 2005.

(51) Int. Cl.
  B65D 85/00 (2006.01)
  B65D 85/38 (2006.01)
  B65D 71/00 (2006.01)
(52) U.S. Cl. .................. 206/320; 206/305; 206/576
(58) Field of Classification Search .......... 206/305, 206/320, 576, 216, 549; 361/683, 610, 625, 361/FOR. 106; 381/392
See application file for complete search history.

(56) References Cited

U.S. PATENT DOCUMENTS

| | | | | |
|---|---|---|---|---|
| 3,546,396 A | * | 12/1970 | Marcheschi et al. | 379/369 |
| 3,779,337 A | * | 12/1973 | Gregory | 181/151 |
| 4,072,829 A | * | 2/1978 | Ogihara | 381/392 |
| 5,242,056 A | * | 9/1993 | Zia et al. | 206/576 |
| 5,344,339 A | * | 9/1994 | Cheslock | 439/501 |
| 5,485,922 A | * | 1/1996 | Butcher | 206/576 |
| 5,666,265 A | * | 9/1997 | Lutz et al. | 361/683 |
| 5,764,475 A | | 6/1998 | LeVander | |
| 5,810,168 A | * | 9/1998 | Eggering | 206/372 |
| 5,812,369 A | | 9/1998 | Hsu | |
| 5,857,568 A | * | 1/1999 | Speirs | 206/320 |
| 6,105,766 A | * | 8/2000 | Chuang | 206/320 |
| 6,257,407 B1 | * | 7/2001 | Truwit et al. | 206/320 |
| 6,526,150 B2 | * | 2/2003 | Kelly et al. | 381/353 |
| 6,530,475 B1 | * | 3/2003 | Penney | 206/320 |
| 6,597,568 B2 | | 7/2003 | Ryder | |
| 2002/0000390 A1 | * | 1/2002 | Hollingsworth | 206/320 |

* cited by examiner

*Primary Examiner*—Stephen Garbe
*Assistant Examiner*—Dene Quest

(57) ABSTRACT

A multi-functional carrying case includes a base section including a divider with a plurality of apertures. The base section has top and bottom portions bifurcated by the divider. A control panel seated within the lower section is electrically mated to an external power supply, and includes a power distribution panel and a surge protector provided with a ground-fault interrupt circuit. Phone and Ethernet input jacks are connected to the switch. The jacks and a power strip are disposed exterior of the base station and mounted to one side thereof. A plurality of power outlets is coupled to the control panel and electrically mated to the interrupt circuit. Retractable phone and power cords are anchored to the control panel and electrically mated to the surge protector. A multi-pencil storage member is coupled to an interior of the carrying case, and a clip board and calculator are housed therein.

12 Claims, 10 Drawing Sheets

MULTI-FUNCTIONAL CARRYING CASE FOR LAPTOPS AND LIKE PORTABLE COMPUTERS

CROSS REFERENCE TO RELATED APPLICATIONS

This application claims the benefit of U.S. Provisional Application No. 60/707,107, filed Aug. 11, 2005.

STATEMENT REGARDING FEDERALLY SPONSORED RESEARCH OR DEVELOPMENT

Not Applicable.

REFERENCE TO A MICROFICHE APPENDIX

Not Applicable.

BACKGROUND OF THE INVENTION

1. Technical Field

This invention relates to carrying cases and, more particularly, to a multi-functional carrying case for laptops and like portable computers for supporting a laptop and associated accessories.

2. Prior Art

There are a plethora of different types of carrying cases for laptop or notebook computers. The great variety among carrying cases is a good indication that none of the different designs are ideal. This condition is at least in part due to the versatility of the laptop computer to perform a wide range of functions for a wide range of users. At one end is the carrying case that might be ideal for the familiar 'road warrior' individual whose computer is the center of a very complete mobile office. This type of carrying case might resemble a suitcase or a large sample case having a padded compartment within to safely carry the laptop computer. Another extreme is the carrying case that might be desired by a user who thinks of a laptop computer by the synonymous name, the notebook computer. This user might have a paradigm for using the computer which is very similar to the familiar notebook that might be carried by a student, professor, author or scientist to record notes, thoughts and impressions, and to work on different writings or calculations under different circumstances as they present themselves during the day, varying from the kitchen table, to a picnic table, to a desktop, a lecture hall, or on the ground under a tree in the park.

One prior art example shows a foldable carrying case for a notebook computer which has two states; an open state wherein the notebook computer can be used on the open case and a closed state wherein the notebook computer can be transported with the computer being protected with padding on all 6 faces of the computer. The computer case is sized closely to the dimensions of the computer to provide a carrying case that is approximates the dimensions of the case plus the thickness of padding. Unfortunately, this prior art example only protects the computer during transport and does not provide additional accessories such as power jacks, phone jacks or speakers.

Another prior art example shows a case that provides a lightweight framed shock-absorbing insert to resist the impact and to channel much of the impact energy away from the laptop computer. This insert has two flat panels sandwiching the laptop computer. These panels flex in response to impact from any direction, while isolating the laptop computer from direct impact with the floor or the like during impact of the case with the floor. The panels are constrained from collapsing by bending out of the plane of the panel during most impacts. Constraining structures include a surrounding frame between the outer edges flat panels, and surrounding textile constructions that cooperate to keep the flat panels parallel and generally flat during impacts. Again, this prior art example only provides shock protection for the computer, and does not address the need for additional accessories such as power jacks, phone jacks or speakers.

Accordingly, a need remains for a multi-functional carrying case for laptops and like portable computers in order to overcome the above-noted shortcomings. The present invention satisfies such a need by providing an apparatus that is simple and easy to use, is lightweight and durable in design, and is portable, thus advantageously allowing a user to utilize the computer when out in the field. Such an assembly conveniently includes a power strip, power, high speed internet and phone cords, and speakers. The assembly also includes separate compartments for storage, and a convenient hanging paper holder. In addition, the assembly provides effective shock protection the user's computer, and the interior is conveniently adjustable to accommodate computers of different sizes.

BRIEF SUMMARY OF THE INVENTION

In view of the foregoing background, it is therefore an object of the present invention to provide an apparatus for a multi-functional carrying case for laptops and like portable computers. These and other objects, features, and advantages of the invention are provided by a multi-functional carrying case for supporting a laptop and associated accessories.

The multi-functional carrying case includes a base section including a divider removably positioned therein. Such a base section further has top and bottom portions effectively bifurcated by the divider such that the top and bottom portions are advantageously isolated within the base section when the divider is nested therein. Such a divider is provided with a plurality of apertures conveniently formed therein for channeling the phone and Ethernet cables therethrough and towards the laptop. Of course, such a phone cord is also capable of transmitting high speed internet, as is obvious to a person of ordinary skill in the art.

A control panel is advantageously seated within the lower section and is electrically mated to an external power supply source. Such a control panel conveniently includes a power distribution panel and a surge protector provided with a ground-fault interrupt circuit electrically mated directly thereto. Such a ground-fault interrupt circuit effectively cancels power to the power distribution panel when the control panel exceeds at least one of a threshold temperature and a voltage level respectively. A phone input jack and an Ethernet input jack are operably connected directly to the ground-fault interrupt switch. Such phone and Ethernet input jacks are conveniently disposed exterior of the base section and mounted to one side thereof.

A multi-outlet power strip is conveniently disposed exterior of the base section and is directly mounted to the one side such that the phone and Ethernet input jacks are juxtaposed adjacent thereto. A plurality of 110-volt power outlets 68 is directly coupled to the control panel and electrically mated to the ground-fault interrupt circuit. A retractable phone cord and a retractable power cord are effectively anchored to the control panel and extend outwardly from the lower portion. Such retractable phone and power cords are electrically mated to the surge protector. A multi-pencil storage member is directly coupled to an interior of the carrying case. A clip board and calculator are removably housed within the carrying case.

The apparatus includes a top section pivotally connected directly to the base section. Such a top section has convenient first and second isolated storage portions provided with confronting outer edges respectively. First and second zippers are directly mated to the first and second storage portions of the top section such that a user may advantageously close the first and second storage portions during traveling conditions. The apparatus includes a plurality of apertures advantageously formed in the one side and juxtaposed adjacent to the power outlet strip for directly connecting the retractable phone and Ethernet cords outwardly from the base section.

The apparatus preferably further includes a pair of convenient battery-holding straps directly mated to another side of the base section and disposed exterior of the lower portion. The apparatus also preferably further includes a plurality of speakers conveniently nested within the top section and the base section. Such speakers include a plurality of impact-absorbing pads confronting thereabout for effectively maintaining the speakers at substantially stable positions during traveling conditions. The speakers are controlled by volume, treble, bass and balance switches attached to the surface of the second divider.

The apparatus may further include a paper-holding clip that is pivotally anchored to the base section. Such a clip has monolithically formed first and second arms registered orthogonal to each other wherein the first arm conveniently extends vertically to the top section and the second arm advantageously pivots outwardly from the carrying case. Such a second arm has a longitudinal length greater than a longitudinal length of the first arm such that a paper document can be effectively supported therealong without interfering with a keyboard of the laptop seated in the base section. The clip is spring-actuated for advantageously allowing the user to quickly detach the paper document as needed without shaking the carrying case, and is advantageous such that a user can continue looking on a level plain while typing instead of having to look downward while typing.

There has thus been outlined, rather broadly, the more important features of the invention in order that the detailed description thereof that follows may be better understood, and in order that the present contribution to the art may be better appreciated. There are additional features of the invention that will be described hereinafter and which will form the subject matter of the claims appended hereto.

It is noted the purpose of the foregoing abstract is to enable the U.S. Patent and Trademark Office and the public generally, especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

BRIEF DESCRIPTION OF THE SEVERAL VIEWS OF THE DRAWING

The novel features believed to be characteristic of this invention are set forth with particularity in the appended claims. The invention itself, however, both as to its organization and method of operation, together with further objects and advantages thereof, may best be understood by reference to the following description taken in connection with the accompanying drawings in which:

DETAILED DESCRIPTION OF THE INVENTION

Figure 1:
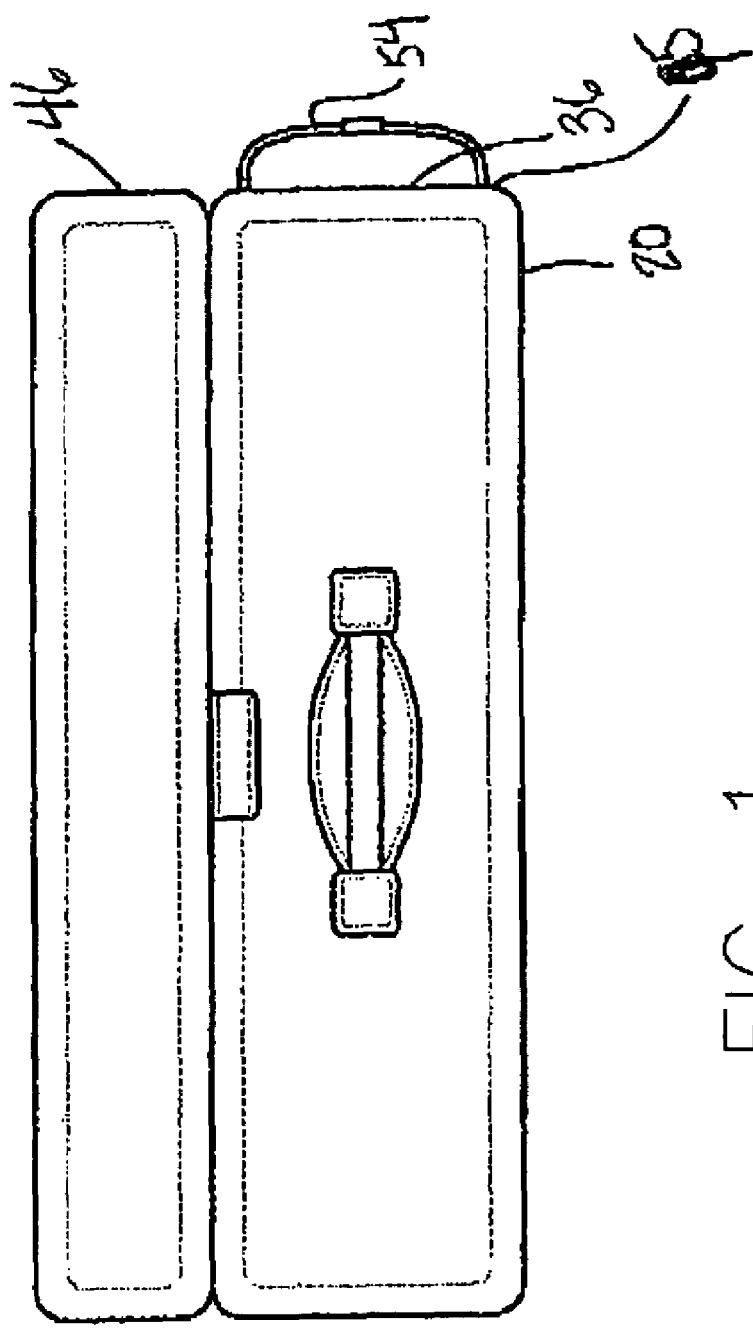
FIG. 1 is a front elevational view of the multi-functional carrying case for laptops and like portable computers, in accordance with the present invention.

The present invention will now be described more fully hereinafter with reference to the accompanying drawings, in which a preferred embodiment of the invention is shown. This invention may, however, be embodied in many different forms and should not be construed as limited to the embodiment set forth herein. Rather, this embodiment is provided so that this application will be thorough and complete, and will fully convey the true scope of the invention to those skilled in the art. Like numbers refer to like elements throughout the figures.

The apparatus of this invention are referred to generally in FIGS. 1-10 by the reference numerals 10 and 10' and are intended to provide a multi-functional carrying case for laptops and like portable computers. It should be understood that the apparatus 10 and 10' may be used to carry many different types of computers and should not be limited in use to carrying only those computers described herein.

Referring initially to FIGS. 1, 2, 3, 4, 5, 6, 7, 8, 9 and 10, the apparatus 10 includes a base section 20 including a divider 21 removably positioned therein. Such a base section 20 further has top and bottom portions (defined as open areas above and below the divider 21) effectively bifurcated by the divider 21, which is important such that the top and bottom portions are advantageously isolated within the base section 20 when the divider is nested therein. Such a divider 21 is provided with a plurality of apertures 22 conveniently formed therein, which is crucial for channeling the phone and Ethernet cables therethrough and towards the laptop. Of course, such a phone cord is also capable of transmitting high speed internet, as is obvious to a person of ordinary skill in the art. The base section 20 further includes an exhaust fan 99 integrally housed therein and mounted beneath the divider 21, which is essential for keeping a computer from overheating during operating conditions. The exhaust fan 99 may be electrically coupled to the power distribution panel with a relay switch such that power is automatically transmitted to the exhaust fan 99 when the laptop is turned on.

Figure 4:
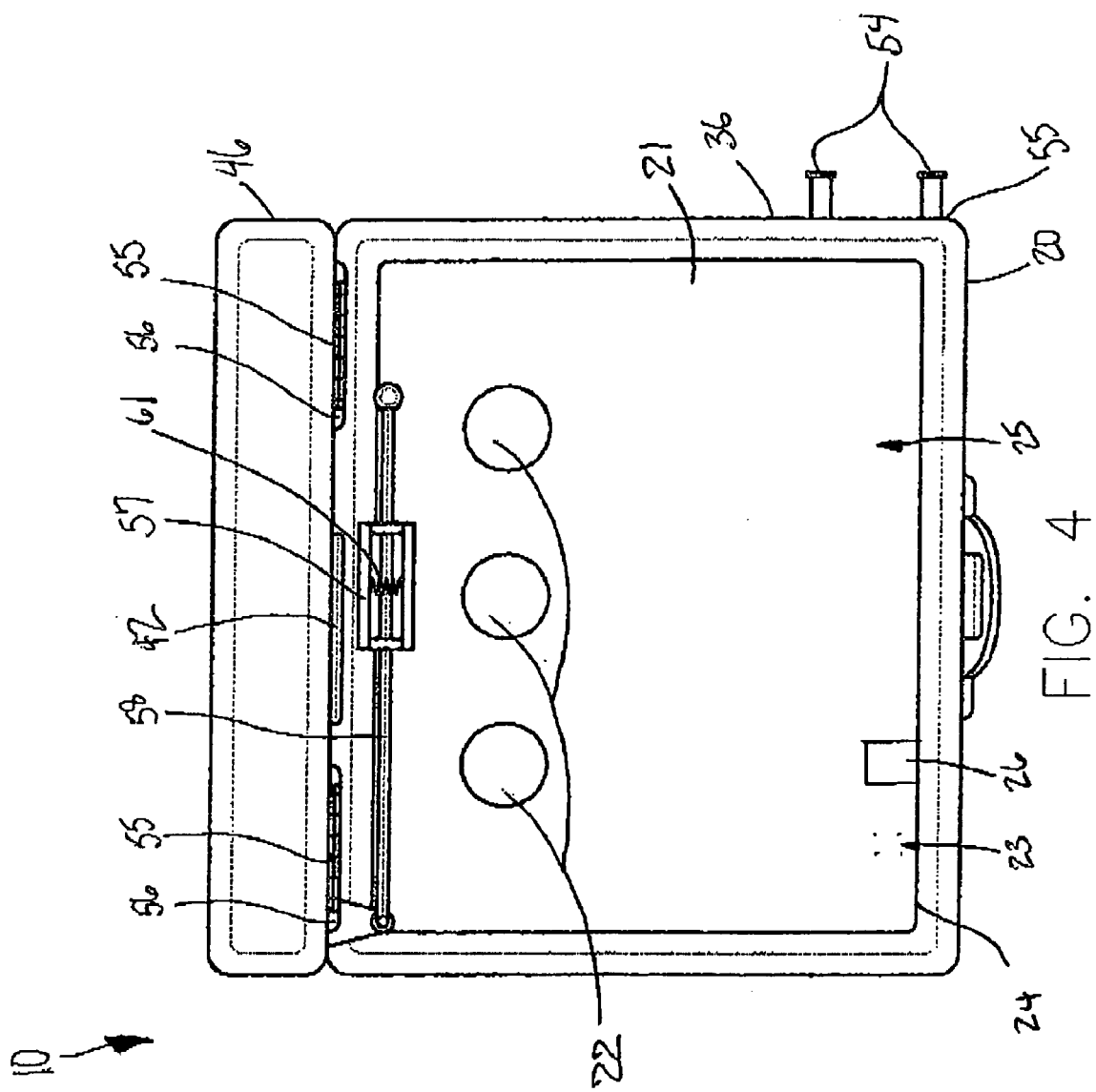
FIG. 4 is a top plan view of the apparatus shown in FIG. 2.
Figure 5:
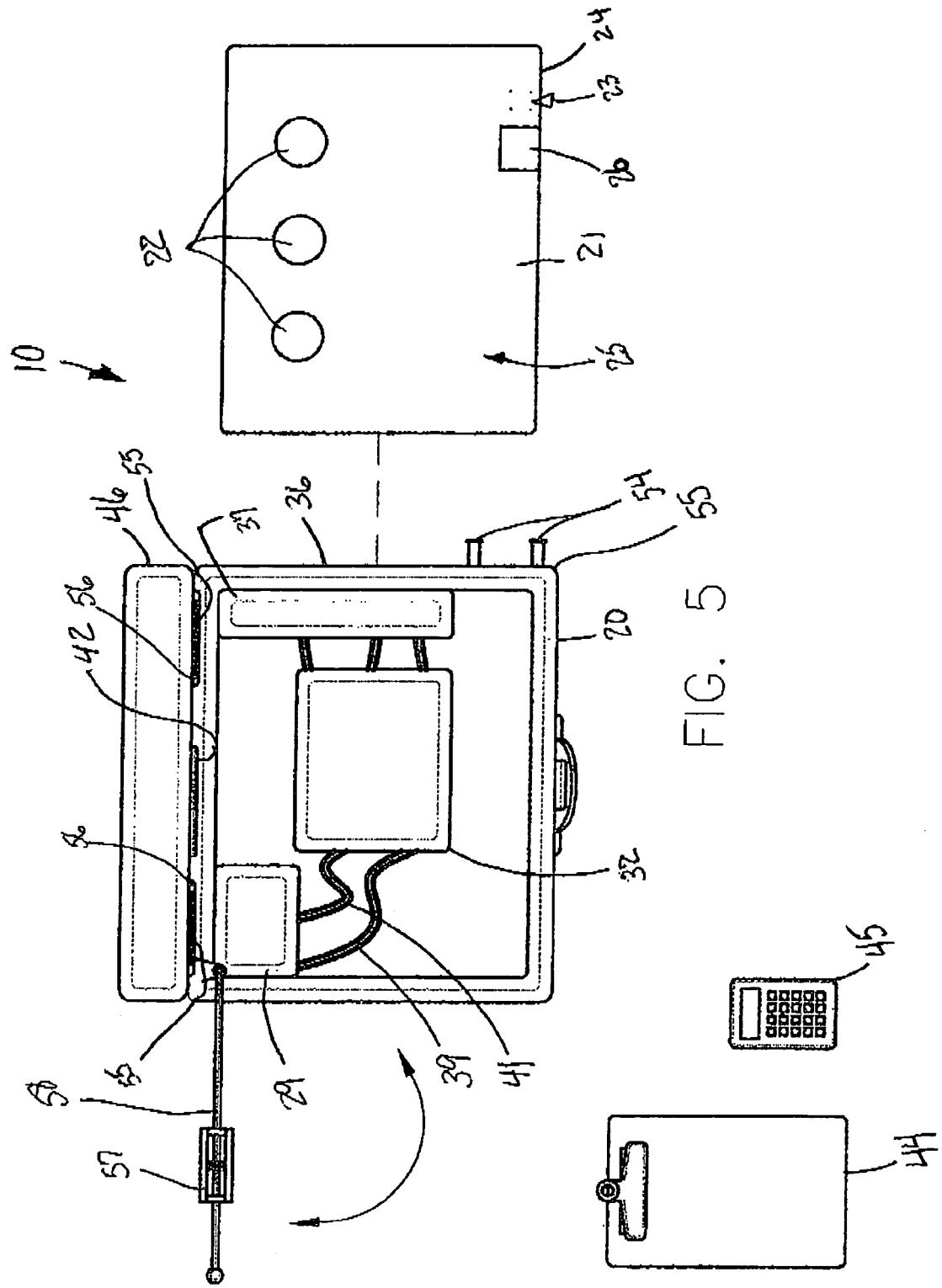
FIG. 5 is a top plan view of the apparatus shown in FIG. 4 showing the paper holding clip pivoted outwardly from the carrying case, the divider removed from the base section, and the included clipboard and calculator.
Figure 6:
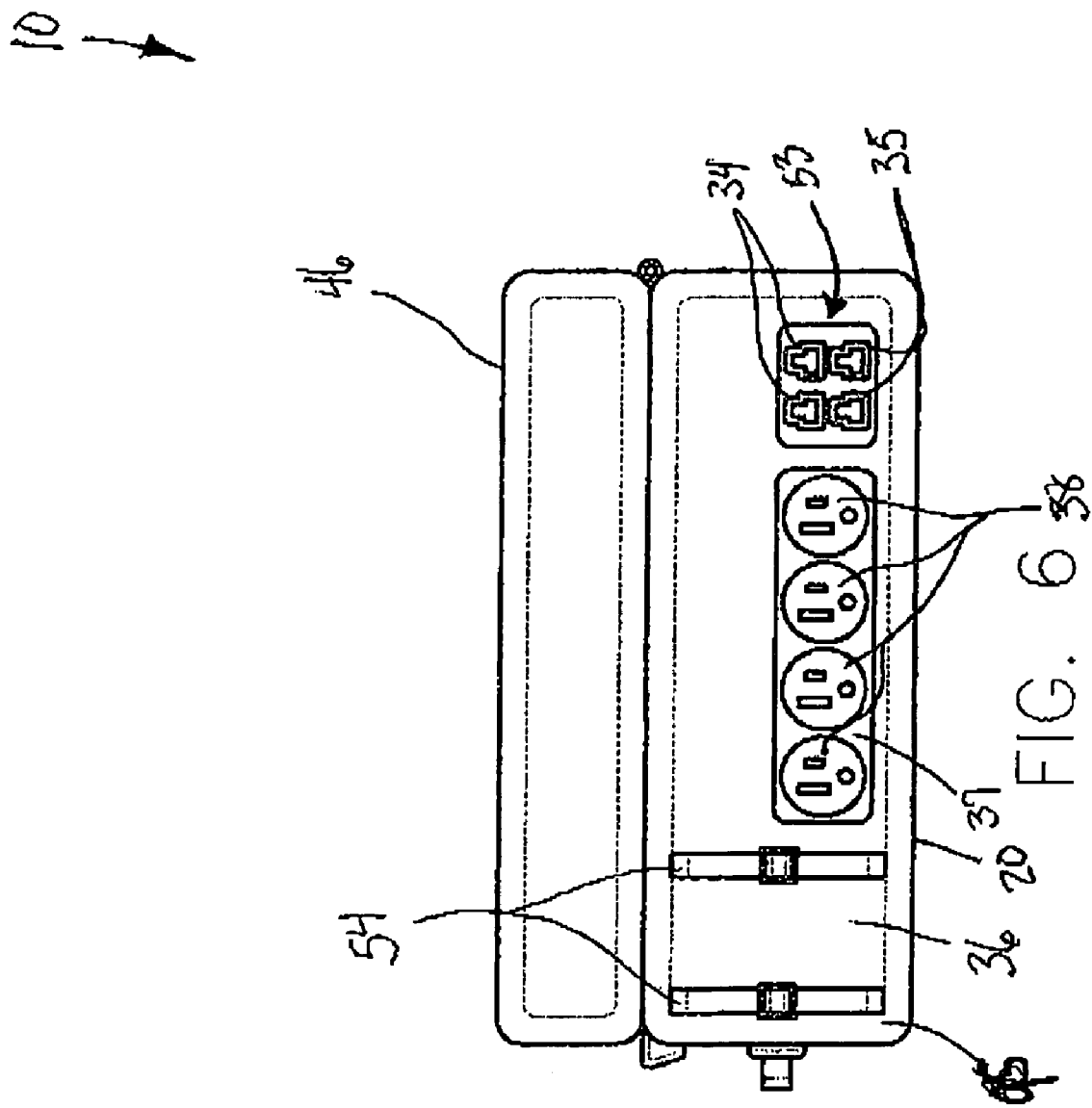
FIG. 6 is a side elevational view of the apparatus shown in FIG. 1 showing the battery holders, power strip and input jacks.
Figure 7:
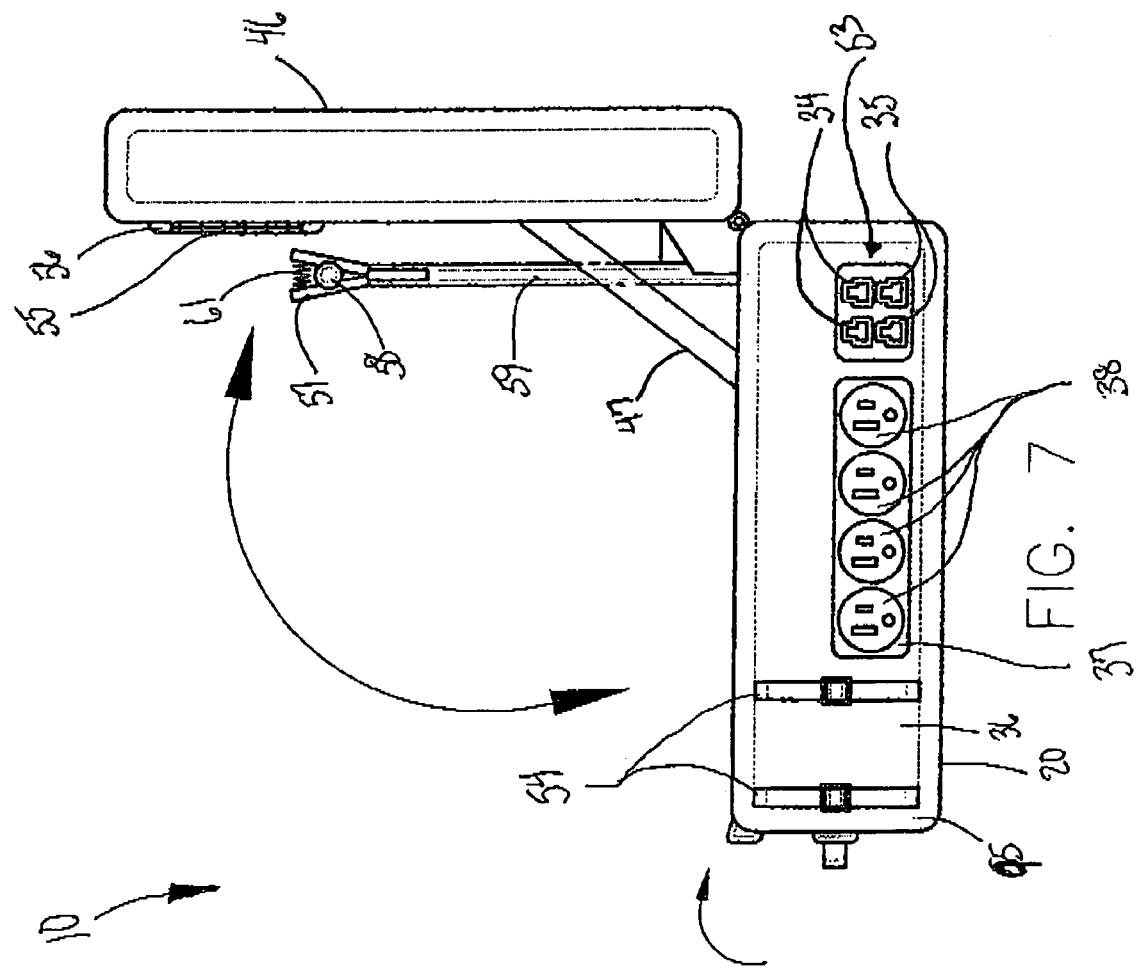
FIG. 7 is a side elevational view of the apparatus shown in FIG. 6 showing the top section biased to an open position.

Referring to FIGS. 4 and 5, the divider 21 further includes hook-and-loop fasteners 23 permanently affixed around an outer perimeter 24 of a surface 25 thereof. Cushions 26 with permanently affixed hook-and-loop fasteners 27 are removably positioned around a surface 25 of said divider 21, which is essential for protecting the computer during transport. Of course, such cushions can be produced in a variety of sizes, as is obvious to a person of ordinary skill in the art. 2.

Figure 9:
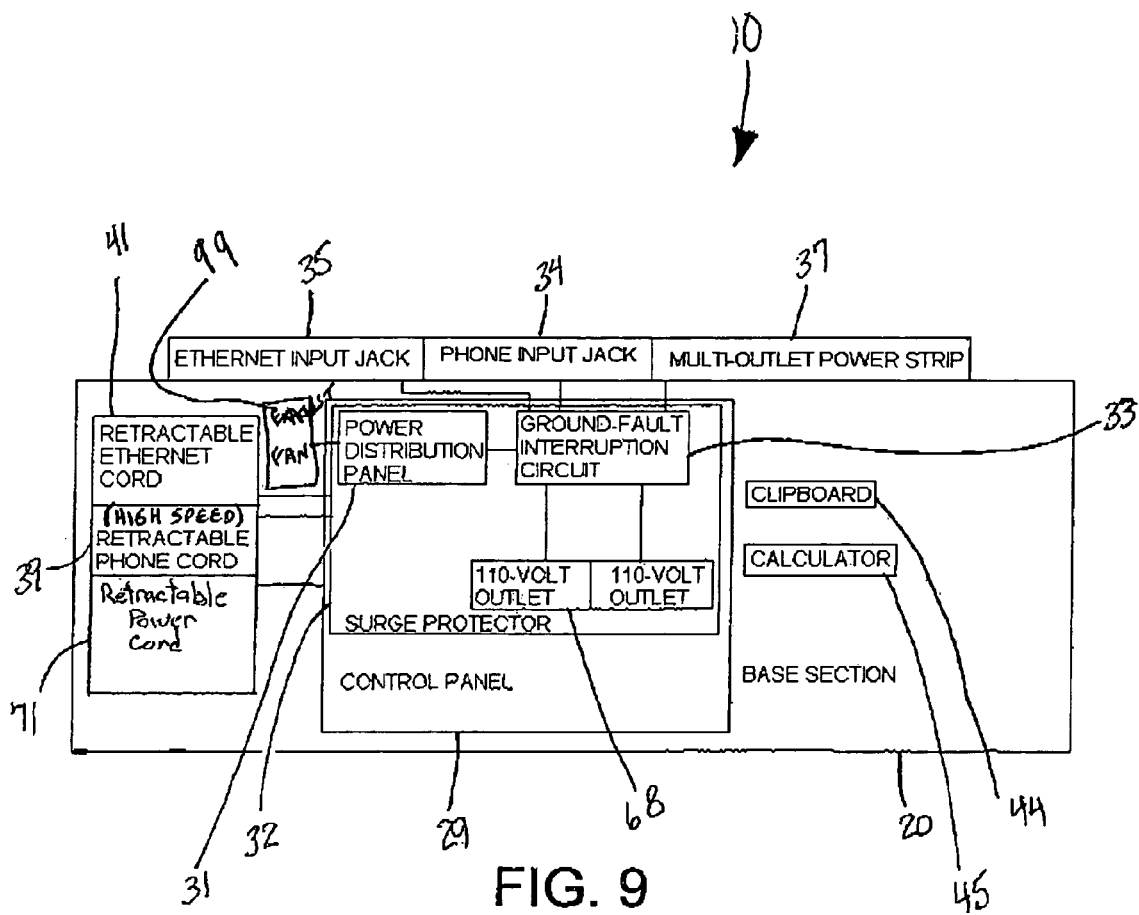
FIG. 9 is a schematic block diagram of the apparatus shown in FIG. 1.

Referring to FIGS. 5 and 9, the apparatus 10 includes a control panel 29 that is advantageously seated within the base section 20 and is electrically mated to an external power supply source. Such a control panel 29 conveniently includes a power distribution panel 31 and a surge protector 32 provided with a ground-fault interrupt circuit 33 electrically mated directly thereto, without the use of intervening elements. Such a ground-fault interrupt circuit 33 effectively cancels power to the power distribution panel 31 when the control panel 29 exceeds at least one of a threshold temperature and a voltage level respectively, which is vital for protecting sensitive computer components from damage. A phone input jack 34 and an Ethernet input jack 35 are operably connected directly to the ground-fault interrupt circuit 33, without the use of intervening elements. Such phone 34 and Ethernet 35 input jacks are conveniently disposed exterior of the base section 20 and mounted to one side 36 thereof.

Referring to FIGS. 2, 3, 4, 5, 6, 7 and 9, the apparatus 10 includes a multi-outlet power strip 37 that is conveniently disposed exterior of the base section 20 and is directly mounted to the one side 36, without the use of intervening elements, such that the phone 34 and Ethernet 35 input jacks are advantageously juxtaposed adjacent thereto. A plurality of 110-volt power outlets 38 is directly coupled to the control panel 29, without the use of intervening elements, and electrically mated to the ground-fault interrupt circuit 33. A retractable phone cord 39, Ethernet cord 41 and power cord 71 are effectively anchored to the control panel 29 and extend outwardly from the lower portion. Such retractable phone 39 and Ethernet cords 41 are electrically mated to the surge protector 32, which is vital for protecting sensitive component parts therein from damage. A multi-pencil storage member 42 is directly coupled, without the use of intervening elements, to an interior surface 43 of the apparatus 10. A clip board 44 and calculator 45 are removably housed within the apparatus 10.

Again referring to FIGS. 1 through 10, the apparatus 10 includes a top section 46 pivotally connected directly to the base section 20, without the use of intervening elements. Such a top section 46 includes a plurality of straps 47 conveniently attached to an interior surface 48 thereof and extending downwardly therefrom. The straps 47 are directly connected, without the use of intervening elements, to an interior surface 49 of the base section 20. Such straps 47 effectively prevent said top section 46 from exceeding an angle when biased to an open position, thus advantageously maintaining the top section 46 in a vertical position while the apparatus 10 is being utilized.

Figure 2:
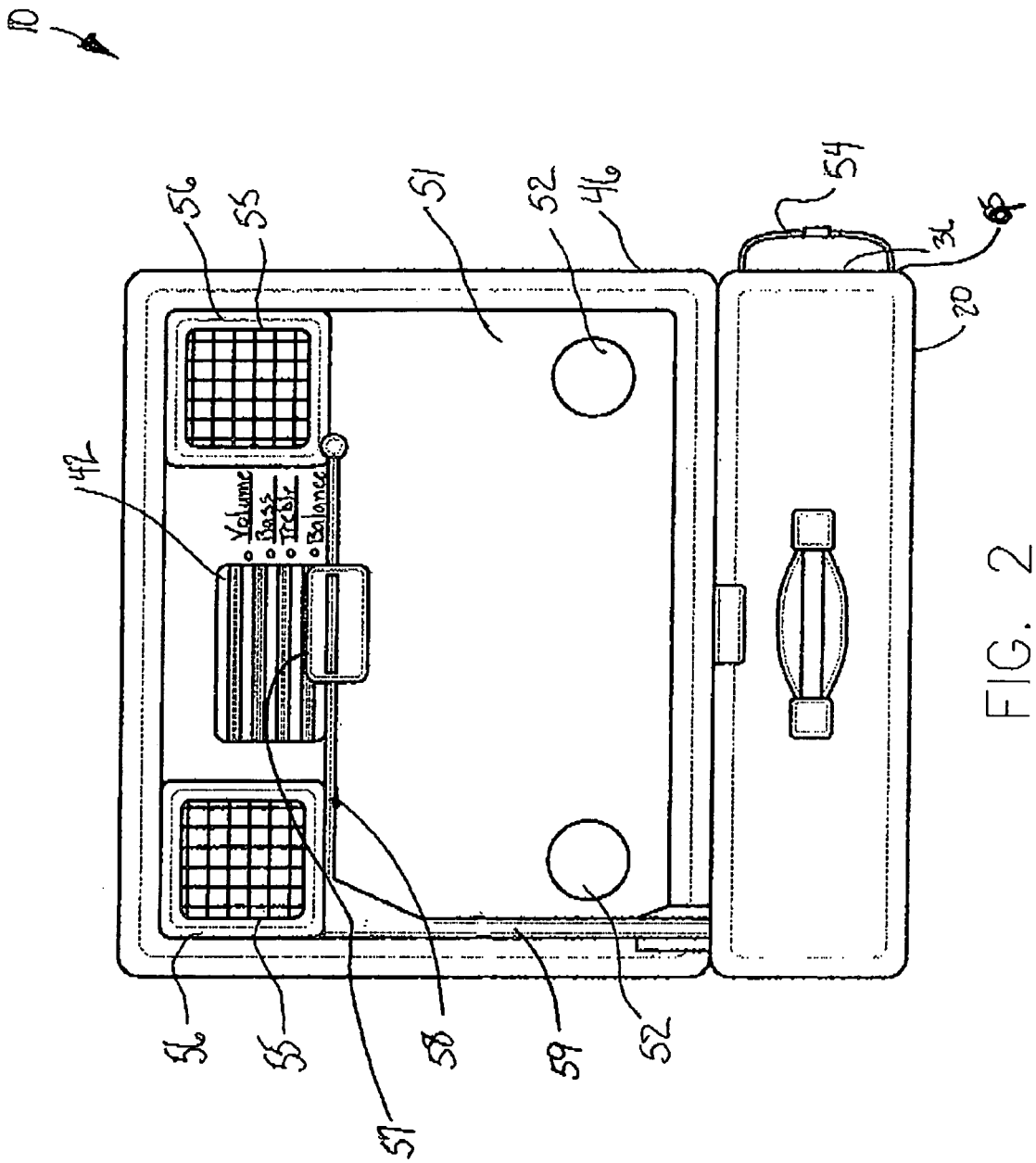
FIG. 2 is a front elevational view of the apparatus shown in FIG. 1 showing the top section biased to an open position.
Figure 3:
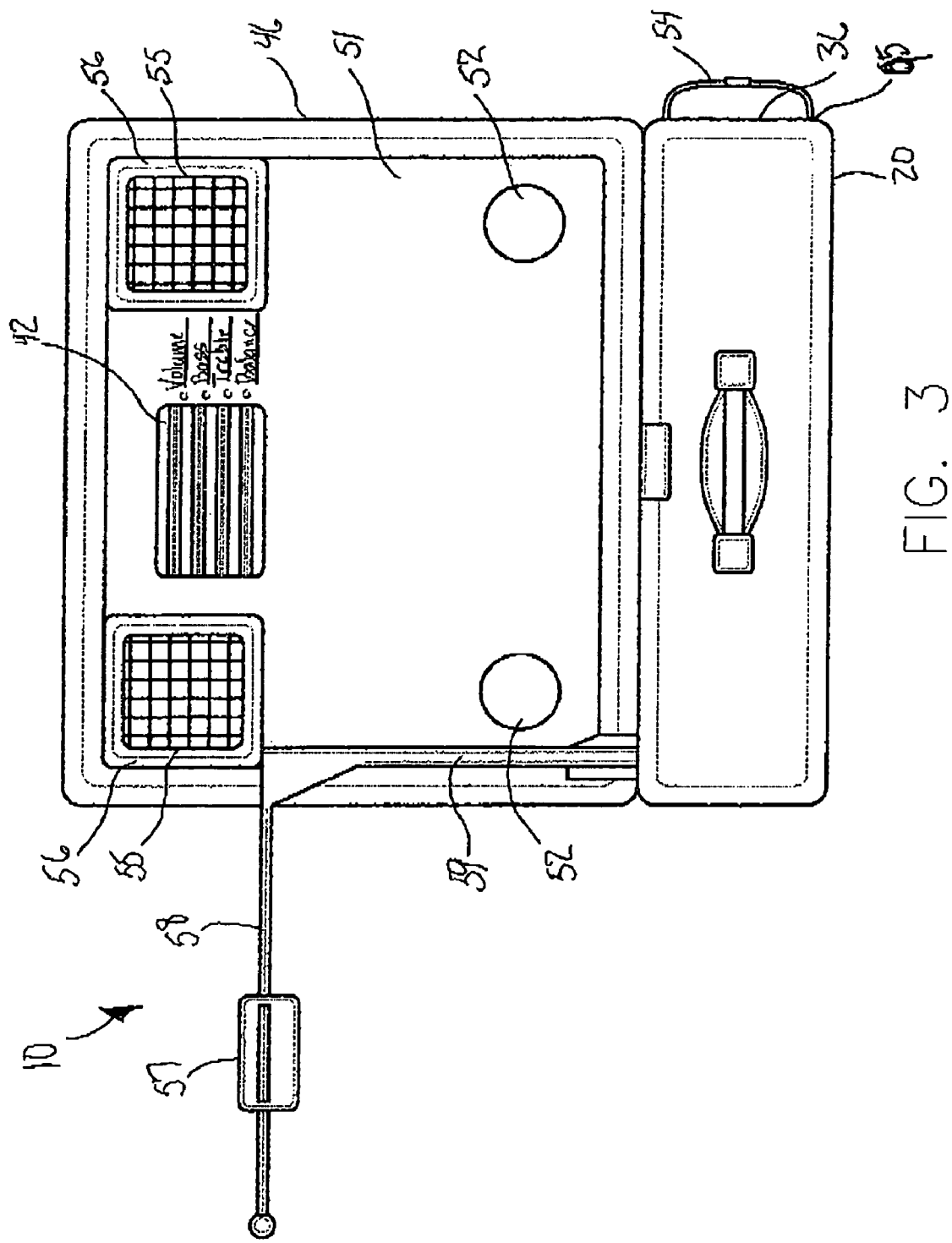
FIG. 3 is a front elevational view of the apparatus shown in FIG. 2 showing the paper holding clip pivoted outwardly from the carrying case.
Figure 8:
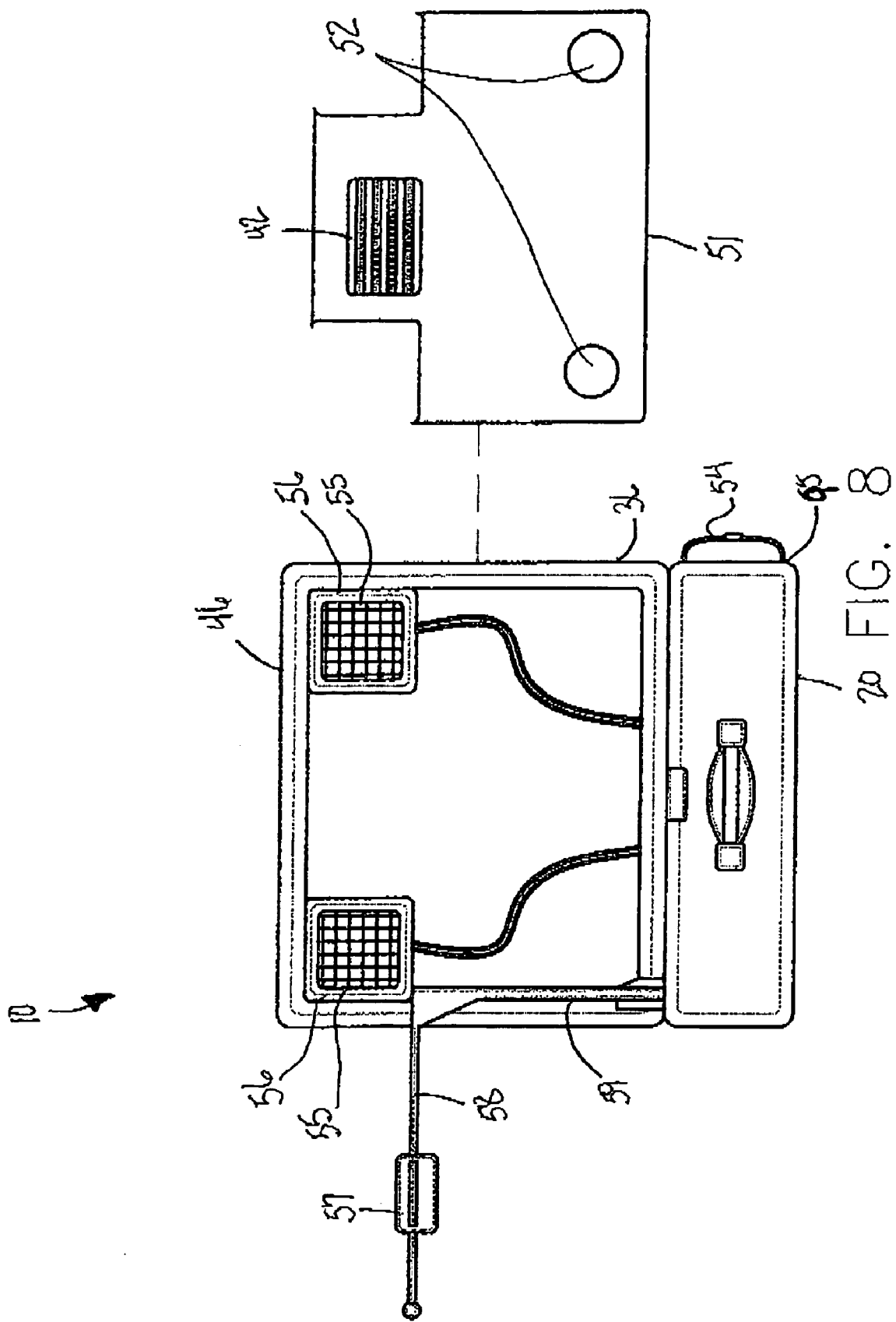
FIG. 8 is a front elevational view of the apparatus shown in FIG. 3 showing the second divider removed from the top section.

Referring to FIGS. 2, 3 and 8, the top section 46 further includes a second divider 51 removably positioned therein. Such a top section 46 further has top and bottom portions (defined as open areas above and below the divider 21) effectively bifurcated by the second divider 51, which is important such that the top and bottom portions are advantageously isolated within the top section 46 when the second divider 51 is nested therein. Such a second divider 51 is provided with a plurality of apertures 52 conveniently formed therein, which advantageously channel the phone and Ethernet cables therethrough and towards the laptop.

Referring to FIGS. 1, 2, 3, 4, 5, 6, 7 and 8, the apparatus 10 includes a plurality of apertures 53 advantageously formed in the one side 36 and juxtaposed adjacent to the power outlet strip 37 for directly connecting the retractable phone 39 and Ethernet 41 cords, without the use of intervening elements, outwardly from the base section 20. The apparatus 10 further includes a pair of convenient battery-holding straps 54 directly mated to an opposite end 95 of the one side 36 of the base section 20, without the use of intervening elements, and disposed exterior of the base section 20.

The apparatus 10 further includes a plurality of speakers 55 conveniently nested within the top section 46. Such speakers 55 include a plurality of impact-absorbing pads 56 confronting thereabout for effectively maintaining the speakers 55 at substantially stable positions during traveling conditions, which is essential for preventing damage to said speakers 55. The speakers 55 are controlled by volume, treble, bass and balance switches attached to the surface of the second divider 51.

Referring to FIGS. 2, 3, 4, 5, 7 and 8, the apparatus 10 further include a paper-holding clip 57 that is pivotally anchored to the base section 20. Such a clip 57 has monolithically formed first 58 and second 59 arms registered orthogonal to each other wherein the first arm 58 conveniently extends vertically to the top section 20 and the second arm 59 advantageously pivots outwardly from the apparatus 10. Such a second arm 59 has a longitudinal length greater than a longitudinal length of the first arm 58, which is vital such that a paper document can be effectively supported therealong without interfering with a keyboard of the laptop seated in the base section 20. The clip 57 is spring-actuated 61, which advantageously allows the user to quickly detach the paper document as needed without shaking the apparatus 10.

Figure 10:
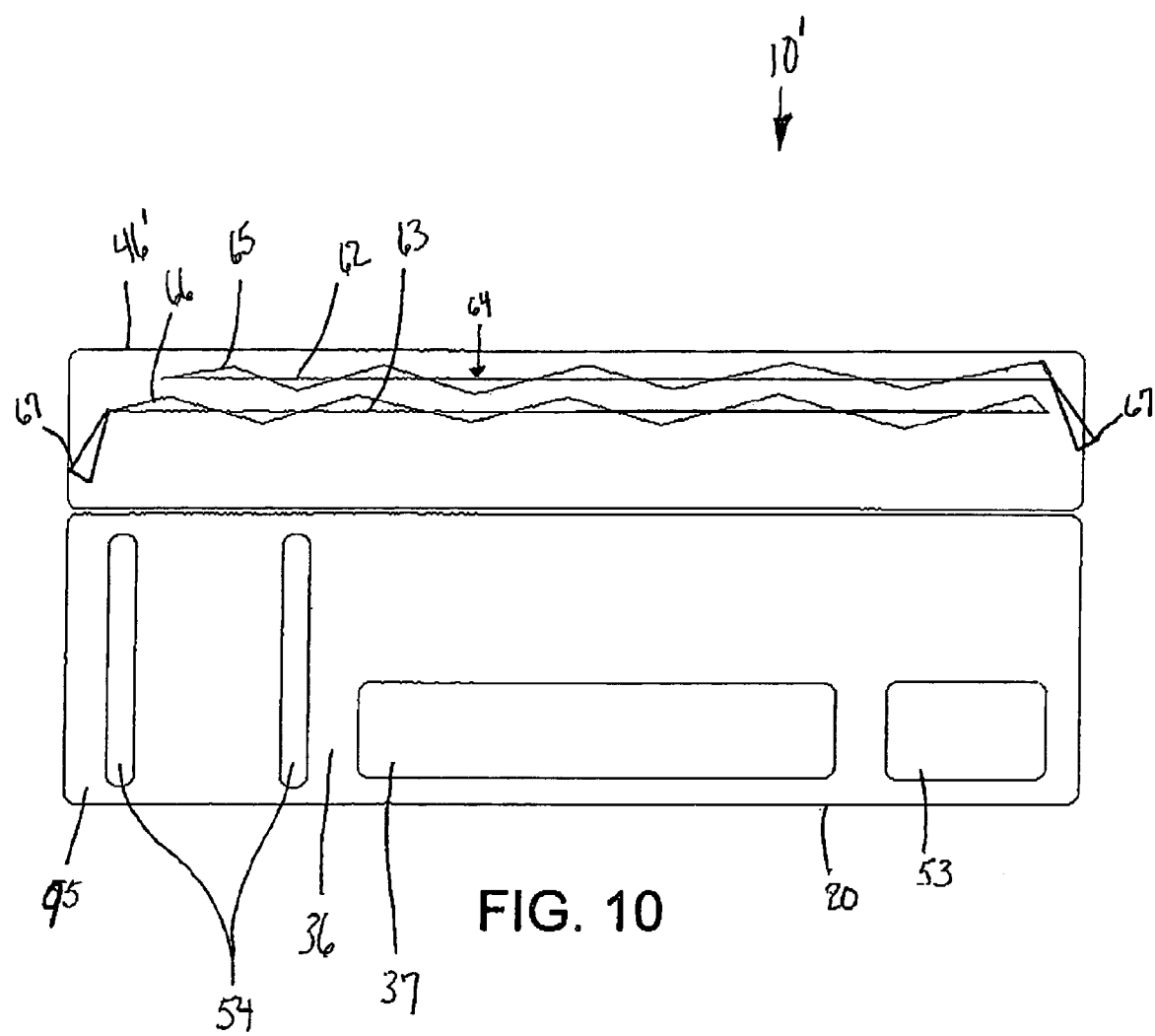
FIG. 10 is a side elevational view of the apparatus shown in FIG. 6 in an alternate embodiment showing the zippered top section.

Referring to FIG. 10, in an alternate embodiment, the apparatus 10' includes a top section 46' that has convenient first 62 and second 63 isolated storage portions provided with confronting outer edges 64 respectively. First 65 and second 66 zippers are directly mated, without the use of intervening elements, to the first 62 and second 63 storage portions of the top section 46', which is essential such that a user may advantageously close the first 62 and second 63 storage portions during traveling conditions. Such zippers 65, 66 include proximal ends 67 that are color coded green, which is vital for alerting a user that the computer is safely secured within the apparatus 10', and ready for transport.

While the invention has been described with respect to a certain specific embodiment, it will be appreciated that many modifications and changes may be made by those skilled in the art without departing from the spirit of the invention. It is intended, therefore, by the appended claims to cover all such modifications and changes as fall within the true spirit and scope of the invention.

In particular, with respect to the above description, it is to be realized that the optimum dimensional relationships for the parts of the present invention may include variations in size, materials, shape, form, function and manner of operation. The assembly and use of the present invention are deemed readily apparent and obvious to one skilled in the art.

What is claimed as new and what is desired to secure by Letters Patent of the United States is:

1. A multi-functional carrying case for supporting a laptop and associated accessories, said multi-functional carrying case comprising:

a base section including a divider removably positioned therein, said base section further having top and bottom portions bifurcated by said divider such that said top and bottom portions are isolated within said base section when said divider is nested therein;

a control panel seated within said base section and being electrically mated to an external power supply source, said control panel including a power distribution panel and a surge protector provided with a ground-fault interrupt circuit electrically mated directly thereto, said ground-fault interrupt circuit canceling power to said power distribution panel when said control panel exceeds at least one of a threshold temperature and a voltage level respectively;

a phone input jack and an Ethernet input jack operably connected directly to said ground-fault interrupt circuit, said phone and Ethernet input jacks being disposed exterior of said base section and mounted to one side thereof;

a multi-outlet power strip disposed exterior of said base section and being directly mounted to said one side such that said phone and Ethernet input jacks are juxtaposed adjacent thereto;

a plurality of 110-volt power outlets directly coupled to said control panel and electrically mated to said ground-fault interrupt circuit;

a retractable phone cord and a retractable power cord anchored to said control panel and extending outwardly from said base section, said retractable phone and power cords being electrically mated to said surge protector;

a top section pivotally connected directly to said base section, said top section having first and second isolated storage portions provided with confronting outer edges respectively;

first and second zippers directly mated to said first and second storage portions of said top section such that a user may close said first and second storage portions during traveling conditions; and a paper-holding clip pivotally anchored to said base section, said clip having monolithically formed first and second arms registered orthogonal to each other wherein said first arm extends vertically to said top section and said second arm pivots outwardly from said carrying case, said second arm having a longitudinal length greater than a longitudinal length of said first arm such that a paper document can be effectively supported therealong without interfering with a keyboard of the laptop seated in said base section, said clip being spring-actuated for allowing the user to quickly detached the paper document as needed without shaking said carrying case.

2. The multi-functional carrying case of claim 1, further comprising:

a plurality of apertures formed in said one side and juxtaposed adjacent to said multi-outlet power strip for directly connecting said retractable phone cord and said retractable power cords outwardly from said base section.

3. The multi-functional carrying case of claim 1, further comprising:

a pair of battery-holding straps directly mated to another side of said base section and disposed exterior of said base section.

4. The multi-functional carrying case of claim 1, further comprising:

a plurality of speakers nested within said top section and said base section, each of said speakers including a plurality of impact-absorbing pads confronting thereabout for maintaining said speakers at substantially stable positions during traveling conditions.

5. A multi-functional carrying case for supporting a laptop and associated accessories, said multi-functional carrying case comprising:

a base section including a divider removably positioned therein, said base section further having top and bottom portions bifurcated by said divider such that said top and bottom portions are isolated within said base section when said divider is nested therein;

a control panel seated within said base section and being electrically mated to an external power supply source, said control panel including a power distribution panel and a surge protector provided with a ground-fault interrupt circuit electrically mated directly thereto, said ground-fault interrupt circuit canceling power to said power distribution panel when said control panel exceeds at least one of a threshold temperature and a voltage level respectively;

a phone input jack and an Ethernet input jack operably connected directly to said ground-fault interrupt circuit, said phone and Ethernet input jacks being disposed exterior of said base section and mounted to one side thereof;

a multi-outlet power strip disposed exterior of said base section and being directly mounted to said one side such that said phone and Ethernet input jacks are juxtaposed adjacent thereto;

a plurality of 110-volt power outlets directly coupled to said control panel and electrically mated to said ground-fault interrupt circuit;

a retractable phone cord and a retractable power cord anchored to said control panel and extending outwardly from said section, said retractable phone and power cords being electrically mated to said surge protector;

a multi-pencil storage member directly coupled to an interior of said carrying case;

a clip board and calculator removably housed within said carrying case;

a top section pivotally connected directly to said base section, said top section having first and second isolated storage portions provided with confronting outer edges respectively;

first and second zippers directly mated to said first and second storage portions of said top section such that a user may close said first and second storage portions during traveling conditions; and a paper-holding clip pivotally anchored to said base section, said clip having monolithically formed first and second arms registered orthogonal to each other wherein said first arm extends vertically to said top section and said second arm pivots outwardly from said carrying case, said second arm having a longitudinal length greater than a longitudinal length of said first arm such that a paper document can be effectively supported therealong without interfering with a keyboard of the laptop seated in said base section, said clip being spring-actuated for allowing the user to quickly detached the paper document as needed without shaking said carrying case.

6. The multi-functional carrying case of claim 5, further comprising:

a plurality of apertures formed in said one side and juxtaposed adjacent to said multi-outlet power strip for directing said retractable phone cord and said retractable power cord outwardly from said base section.

7. The multi-functional carrying case of claim 5, further comprising:

a pair of battery-holding straps directly mated to another side of said base section and disposed exterior of said base section.

8. The multi-functional carrying case of claim 5, further comprising:

a plurality of speakers nested within said top section and said base section, each of said speakers including a plurality of impact-absorbing pads confronting thereabout for maintaining said speakers at substantially stable positions during traveling conditions.

9. A multi-functional carrying case for supporting a laptop and associated accessories, said multi-functional carrying case comprising:

a base section including a divider removably positioned therein, said base section further having top and bottom portions bifurcated by said divider such that said top and bottom portions are isolated within said base section when said divider is nested therein;

a control panel seated within said base section and being electrically mated to an external power supply source, said control panel including a power distribution panel and a surge protector provided with a ground-fault interrupt circuit electrically mated directly thereto, said ground-fault interrupt circuit canceling power to said power distribution panel when said control panel exceeds at least one of a threshold temperature and a voltage level respectively;

a phone input jack and an Ethernet input jack operably connected directly to said ground-fault interrupt circuit, said phone and Ethernet input jacks being disposed exterior of said base section and mounted to one side thereof;

a multi-outlet power strip disposed exterior of said base section and being directly mounted to said one side such that said phone and Ethernet input jacks are juxtaposed adjacent thereto;

a plurality of 110-volt power outlets directly coupled to said control panel and electrically mated to said ground-fault interrupt circuit;

a retractable phone cord and a retractable power cord anchored to said control panel and extending outwardly from said base section, said retractable phone and power cords being electrically mated to said surge protector a multi-pencil storage member directly coupled to an interior of said carrying case;

a clip board and calculator removably housed within said carrying case;

a top section pivotally connected directly to said base section, said top section having first and second isolated storage portions provided with confronting outer edges respectively;

first and second zippers directly mated to said first and second storage portions of said top section such that a user may close said first and second storage portions during traveling conditions; and a paper-holding clip pivotally anchored to said base section, said clip having monolithically formed first and second arms registered orthogonal to each other wherein said first arm extends vertically to said top section and said second arm pivots outwardly from said carrying case, said second arm having a longitudinal length greater than a longitudinal length of said first arm such that a paper document can be effectively supported therealong without interfering with a keyboard of the laptop seated in said base section, said clip being spring-actuated for allowing the user to quickly detached the paper document as needed without shaking said carrying case.

10. The multi-functional carrying case of claim 9, further comprising:

a plurality of apertures formed in said one side and juxtaposed adjacent to said multi-outlet power strip for directing said retractable phone cord and said retractable power cord outwardly from said base section.

11. The multi-functional carrying case of claim 9, further comprising:

a pair of battery-holding straps directly mated to another side of said base section and disposed exterior of said base section.

12. The multi-functional carrying case of claim 9, further comprising:

a plurality of speakers nested within said top section and said base section, each of said speakers including a plurality of impact-absorbing pads confronting thereabout for maintaining said speakers at substantially stable positions during traveling conditions.

\* \* \* \* \*